Patented Apr. 8, 1952

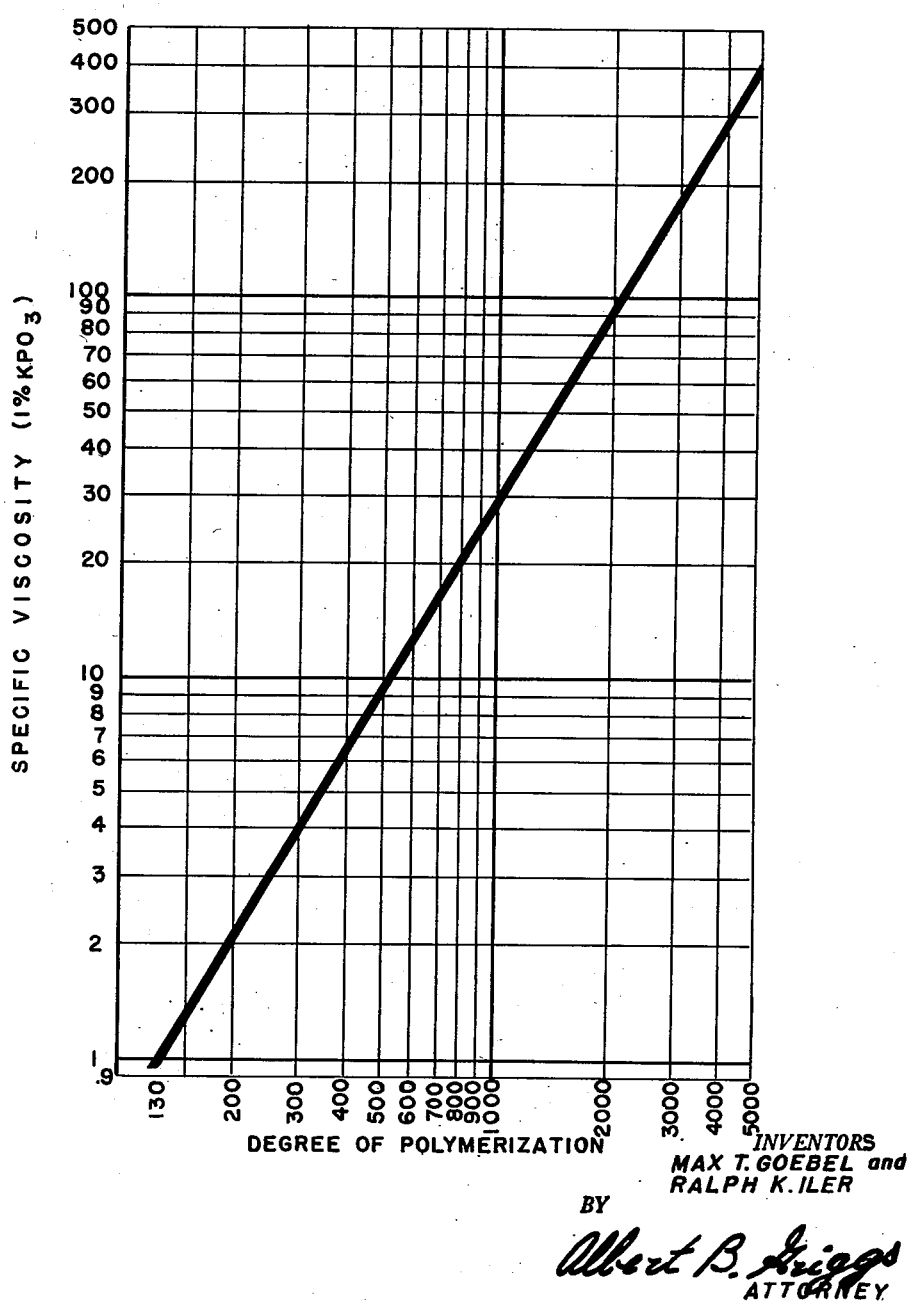

2,592,273

UNITED STATES PATENT OFFICE 2,592,273

QUATERNARY AMMONIUM SALTS OF HIGH MOLECULAR WEIGHT POLYMETAPHOSPHORIC ACID

Max T. Goebel, Landenburg, Pa., and Ralph K. Iler, Cleveland Heights, Ohio, assignors to E. I. du Pont de Nemours & Company, Wilmington, Del., a corporation of Delaware Application November 13, 1948, Serial No. 59,913

11 Claims. (Cl. 260—2)

This invention relates to quaternary ammonium salts of high molecular weight polymetaphosphoric acid.

Long chain quaternary ammonium salts of low molecular weight polymetaphosphoric acid have been prepared. The reaction has been found of interest only in connection with analytical methods and the products produced have no apparent value. The products when dried are amorphous, weak, and of little practical use.

It is an object of this invention to prepare novel quaternary ammonium polymetaphosphates. It is a further object to provide quaternary ammonium polymetaphosphates which are suitable for use as film-forming and coating compositions and for inclusion in film-forming compositions, in coating compositions, in adhesives, for increasing the viscosity of organic systems, for modifying the properties of lubricants, and for modifying detergent compositions. It is a still further object to provide quaternary ammonium polymetaphosphates which are resinous in character and which are generally adaptable to various of the purposes for which relatively high viscosity resins have heretofore been employed. Further objects will become apparent hereinafter.

The foregoing and other objects of the invention are attained by preparing quaternary ammanium polymetaphosphates from polymetaphosphoric acid or a polymetaphosphate of high molecular weight.

The simplest quaternary ammonium polymetaphosphates of the invention may be represented by the general formula 1:

In this formula $R_1$, $R_2$, $R_3$, and $R_4$ may be any monovalent organic radical, or two of them taken together may be a divalent organic group, or the compounds may be cyclic and the nitrogen atom may be included in a heterocyclic ring.

The $x$ in the formula represents the number of phosphorus atoms per molecule and has the value of 130 or more. The value of $x$ will be more completely discussed hereinafter.

As will be apparent as the description proceeds, the invention is not primarily concerned with the cation of the quaternary ammonium salt, and it may have any of the types of structure heretofore known for such quaternary compounds.

While, as indicated, the nitrogen substituents may be any organic groups, it is preferred that the nitrogen valences represented by $R_1$, $R_2$, $R_3$, and $R_4$, be satisfied by unsubstituted hydrocarbon groups from 1 to 20 carbon atoms. The substituents may be the same or different and if a divalent group is used, it may satisfy two of the valences.

If the nitrogen atom is included in a heterocyclic ring, the quaternary group may be of the type of the pyridinium polymetaphosphates, piperidinium polymetaphosphates, pyrrolidinium polymetaphosphates, and quinolinium polymetaphosphates.

As examples of unsubstituted hydrocarbon radicals there may be named such aliphatic groups as:

| | |
|---|---|
| Methyl | Hendecyl |
| Ethyl | Dodecyl |
| Propyl | Tridecyl |
| Butyl | Tetradecyl |
| Pentyl | Pentadecyl |
| Hexyl | Hexadecyl |
| Heptyl | Heptadecyl |
| Octyl | Octadecyl |
| Nonyl | Nonadecyl |
| Decyl | Eicosyl |

Instead of saturated substituents, one may satisfy one of the valences $R_1$, $R_2$, $R_3$, or $R_4$ with an unsaturated group such as the following:

| | |
|---|---|
| Ethenyl | Dodecenyl |
| Propenyl | Tridecenyl |
| Butenyl | Tetradecenyl |
| Pentenyl | Pentadecenyl |
| Hexenyl | Hexadecenyl |
| Heptenyl | Heptadecenyl |
| Octenyl | Octadecenyl |
| Nonenyl | Nonadecenyl |
| Decenyl | Eicosenyl |
| Hendecenyl | |

It will be understood that the substituents or any of them may be cyclic and, for instance, they may be alicyclic. Thus, as a substituent there may be used the cyclohexyl group.

Similarly, the cycloalicyclic compounds may be unsaturated and they may be unsaturated in varying degrees. There may be used, for instance, the 1,3-cyclohexyldienyl group.

In addition to the aliphatic and cycloaliphatic substituents of the character described, one may use aromatic types of substituents in one of the positions under discussion. For instance, one may use:

Phenyl
Naphthyl
Diphenyl
Abietyl
Fluoryl

While, as has been indicated, it is preferred to satisfy the valences R₁, R₂, R₃, and R₄ with unsubstituted hydrocarbon groups of from one to twenty carbon atoms, one may prepare compounds of the invention by using substituted hydrocarbon groups. It seems hardly necessary to list all of the possible substitutions since such compounds are generally well known as applied to quaternary ammonium salts and since the invention is here not directed primarily to the cation of the molecule.

The groups above described and other organic radicals may be substituted in one or more positions with such groups as fluoro, chloro, alkoxy, nitro, bromo, aryloxy, carboxy, etc.

In employing substituents as above described one skilled in the art will not attempt to put too many long-chain substituents on the nitrogen atom because of the well-known phenomenon of steric hindrance. Thus, with phenyl groups it is not feasible to prepare quaternary ammonium salts with more than one such substituent. Thus it may generally be said that it will ordinarily be desirable to use no more than one aryl group of not more than twenty carbon atoms. Steric hindrance is less of a problem, as is well known, with aliphatic substituents.

While, as above discussed, the compounds of the invention may be composed of equivalent amounts of a quaternary ammonium group and a polymetaphosphate group according to the Formula 1, it will often be found preferable to have the quaternary ammonium polymetaphosphate contain an alkali metal. Such a compound will have the following structure:

2.

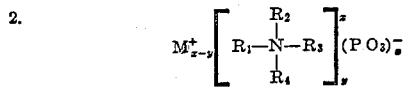

The nitrogen substituents may be any of the groups as previously discussed, and $x$ may have the values previously given for $x$ in Formula 1.

In Formula 2, M is an alkali metal and may be sodium, potassium or lithium. Since both the metal and the quaternary ammonium group are monovalent, it will be seen that the sum of their charges should equal that on the polyphosphate group. This is shown by indicating that the number of metal atoms per molecule is $x$ minus $y$.

The value of $y$ may vary from one-tenth of $x$ to the point where it is equal with $x$. This last instance will of course make the formula identical with Formula 1. However, as indicated, compounds such as those shown in Formula 2 should have at least one quaternary ammonium group for each ten phosphorus atoms in the molecule. As shown by the formula, the number of atoms of the alkali metal will be found by difference.

It is also to be noted that a careful analysis of compounds of the invention will sometimes show that there are positive valences which are satisfied neither by the quaternary ammonium group nor by the monovalent metal. These valences, which are few in number, are apparently satisfied by hydrogen. This effect is particularly noted when the organic substituents on the nitrogen are large, and steric hindrance probably accounts for the discrepancy. There is apparently not room in the molecule for substitution and the very small hydrogen atom is the largest which can be crowded in. The amount of hydrogen will run as high as, say, ten or fifteen per cent of the total equivalents of cations present, especially if the compounds are formed in an acidic solution. It is ordinarily preferred to keep these hydrogen-satisfied valences as low as possible and to satisfy the valences rather with the alkali metal and with the quaternary ammonium group.

In addition to including an alkali metal substituent in polymetaphosphates of the invention, the compounds may still further contain a cross-linking polyvalent metal so that the quaternary ammonium polymetaphosphates have a formula as follows:

3.

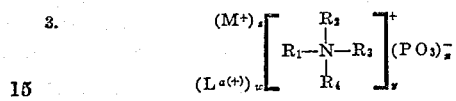

In this formula the substituents for N are the same as described in Formula 1, as is the value of $x$.

M is an alkali metal, as previously discussed, and L is a polyvalent, preferably a divalent or trivalent metal with an atomic weight below 210. L may be such metals as magnesium, aluminum, calcium, zinc, cadmium, barium, lead, iron, cobalt, nickel, tin, manganese, and chromium.

The total charges on N, L, and on the quaternary group will, of course, equal $x$. The value of $y$ should be, as has previously been indicated for Formula 2, at least one-tenth of $x$.

$wa$ plus $z$ plus $y$ will, of course, equal $x$, and $w$, as will be apparent, will equal $$\frac{x-y-z}{a}$$

The letter "$a$" in the formula represents the number of positive valences of L, and is more than 1 and is preferably 2 or 3 depending upon whether the metal is divalent or trivalent.

The polyvalent metals have the effect of cross-linking the polymer molecules and of increasing the strength and water-resistance of the polymers. Comparatively small amounts give good results and the specific amount to be used in a particular instance can be determined according to the physical properties desired.

More specifically, $w$ should have a value such that there is no more than about one atom of the metal L for every four phosphorus atoms. In other words, $$\frac{w}{x}$$

equals up to about 0.25.

Further specific examples of compounds falling within the Formulas 1, 2, and 3 will be given hereinafter and various illustrative structures will be indicated.

In Formula 3, "$z$" will have the value which $x-y$ has in Formula 2. The value of "$z$" may drop in Formula 3 to zero so that the quaternary ammonium polymetaphosphate will contain a polyvalent-cross-linking metal and a quaternary ammonium group but will not contain the alkali metal group.

Compounds of the invention may be prepared by the methods normally employed for the preparation of salts of quaternary ammonium bases. In each instance, the polymetaphosphoric acid or polymetaphosphate must have a high molecular weight as hereinafter more particularly described.

One convenient route for the preparation of compounds of the invention is to begin by preparing a free polymetaphosphoric acid of high molecular weight by ion-exchange. The polymetaphosphoric acid may then be neutralized with any quaternary ammonium base to yield the quaternary ammonium polymetaphosphate.

In the preparation of polymetaphosphoric acid an aqueous solution of a polymetaphosphate is brought into intimate contact with an ion-exchanger in its acid form. The removal or partial removal of the cation, such as sodium or potassium from sodium or potassium metaphosphates, may be effected as in the Bird Patent 2,244,325.

An insoluble cation-exchanger in its hydrogen form may be used and there may be used, for instance, the hydrogen form of sulfonated carbonaceous exchangers or of sulfonated or sulfited insoluble phenol-formaldehyde resins or acid-treated humic material or other similar exchangers. Sulfonated coal, lignin, peat, or other insoluble sulfonated humic organic material may be used. Even more preferable are the insoluble resins made from phenols, such as those made from phenol itself, diphenylol sulfone, catechol, or naturally occurring phenols as found, for example, in quebracho, and an aldehyde, particularly formaldehyde, which are modified by the introduction of sulfonic groups either in the ring or on methylene groups.

The exchanger is generally prepared in a granular form which is readily leached free of soluble acids or salts. If the exchangers are partially or wholly in a salt form they may be converted to their acid form by washing with a solution of an acid such as hydrochloric, sulfuric, formic, sulfamic, or the like. Excess acid may then be rinsed from the product. A description of such materials and of their use will be found, for instance, in the Bird Patent 2,244,325 previously mentioned and also in the Hurd Patent 2,431,481. The literature is also full of references to these materials and to their applications.

One of the preferred cation-exchange resins for the preparation of polymetaphosphoric acid and compounds of the invention is an aromatic hydrocarbon polymer containing nuclear sulfonic acid groups, which is designated "Dowex 50" and is described in D'Alelio 2,366,007 and which is fully described as to its characteristics, properties, and general mode of use in the Journal of the American Chemical Society for November 1947, volume 69, No. 11, beginning at page 2830.

The preparation of potassium polymetaphosphates of high molecular weight is described in P. Pascal Bull. Soc. Chim. [4] 35, pp. 1127, et seq. 1924. From these polymetaphosphates of high molecular weight the acids of corresponding high molecular weight can be prepared as above described by ion-exchange. It is to be noted that sodium polymetaphosphates of high molecular weight are known but are much more difficult to prepare than the potassium compounds. They can similarly be used, however, for preparation of the polymetaphosphoric acids of high molecular weight by ion-exchange.

Instead of using the sodium or potassium polymetaphosphates any high molecular weight polymetaphosphate may be used. For instance, one may use lithium polymetaphosphate. The choice of which polymetaphosphate will ordinarily be guided by the final product to be produced and if a compound such as that shown in Formula 2, or 3, above is to be prepared, then it is most direct to begin with the corresponding alkali metal polymetaphosphate and partially remove alkali metal with an ion-exchange resin.

The metal L in Formula 3, may similarly be introduced into the compound by starting with a polymetaphosphate of lead, calcium, or another of the metals which L represents. Again, as much of the metal will be removed as is necessary to leave the amount desired in the compound and thereafter an alkali metal and a quaternary ammonium group may be introduced to produce a compound as shown in Formula 3.

Whether a particular polymetaphosphate is of high molecular weight to be suitable for conversion to the free polymetaphosphoric acid and then to a quaternary ammonium salt according to the invention can be determined as explained more fully hereinafter. It will be understood that the present invention is not concerned with the preparation of the polymetaphosphoric acid or polymetaphosphate of high molecular weight but is directed to processes employing these in the preparation of novel compounds.

Instead of preparing quaternary ammonium polymetaphosphates by reaction of the acid with the quaternary ammonium base, one may alternatively use the double decomposition of a polymetaphosphate with a quaternary ammonium salt. For instance, potassium polymetaphosphate may be suspended in water in which there is dissolved a quaternary ammonium chloride. The two will react to produce the quaternary ammonium polymetaphosphate and potassium chloride. Ordinarily the quaternary ammonium polymetaphosphate produced will contain some of the alkali metal as in Formula 2, above.

To cause the potassium polymetaphosphate to go into solution it may be found advantageous to add a small amount of a soluble sodium salt such as sodium chloride. This practice will be found particularly advantageous when comparatively small amounts of the quaternary ammonium salt are introduced into the polymetaphosphate.

While, as has been indicated, the quaternary ammonium polymetaphosphates which contain an alkali metal may be most easily prepared by starting with the corresponding alkali metal polymetaphosphate, it would of course be possible to begin with the free polymetaphosphoric acid which could be appropriately reacted with a quaternary ammonium compound and a compound of the alkali metal.

The introduction of a polyvalent metal as shown in Formula 3, will ordinarily be effected most easily by forming a free polymetaphosphoric acid or one which has a desired content of alkali metal and thereafter reacting with a quaternary ammonium base and a base of the polyvalent metal. The reactions may be conducted simultaneously or one after the other. It will be apparent that the pH of the system must be sufficiently low so that the polyvalent metal will react with the polymetaphosphate, otherwise the metal hydroxide or metal oxide would simply remain in the solution unreacted. The formation of this type of compound will be more fully illustrated hereafter in the examples.

The quaternary ammonium polymetaphosphates of the invention are characterized by the fact that they contain 130 or more phosphorus atoms per molecule. In other words, the value of $x$ in the Formulas 1, 2, and 3, shown above is 130 or more. More specifically the number of phosphorus atoms will range from 130 to, say, 5000 or preferably 500 to 1000. To prepare such quaternary ammonium polymetaphosphates it is convenient, as has been described above, to use a polymetaphosphate or polymetaphosphoric acid which is of a corresponding high molecular weight.

The determination of the number of phosphorus atoms per molecule in the quaternary ammonium compounds of the invention presents some difficulties, and the expression is used to designate the compounds which have the molecular weights and viscosities as more particularly described hereinafter.

The molecular weight of soluble polymetaphosphates has been determined by the end-group titration method by Olos Samuelson and Densk, Kim. Tid. 56 343–348 (1944). These authors used the titration method whereby the end-groups were determined by the alkali required to raise the pH of a solution of the polymetaphosphate from the methyl red end point to the phenolphthalein end point. For greater accuracy we have used a pH meter in our determination of end-groups and we have taken the titration between pH 5 and pH 9.

Generally, then, for the titration of endgroups a solution is made of the potassium polymetaphosphate. The solution may contain sodium polymetaphosphate or may be entirely sodium polymetaphosphate. There is no difference as to which is used. The metaphosphate concentration should correspond to approximately a tenth normal solution [a 1% solution of $(KPO_3)_x$] and it is titrated in a carbon dioxide-free atmosphere with $1/100$ normal sodium hydroxide solution in order to obtain the upper range of the titration curve and, if necessary with hundredth normal hydrochloric acid in order to obtain that portion of the curve down to pH 5.

From this data the number of equivalents of total alkali required to raise the pH from five to nine is calculated. These equivalents are then expressed in terms of equivalents per one thousand phosphorus atoms in the solution. As shown by Samuelson, cited above, the molecular weight can be calculated directly from this data since each polymer molecule contains two titratable end-groups. Thus, for example, if the average polymetaphosphate molecule contains one thousand phosphorus atoms then it contains two equivalents of titratable end-groups per one thousand phosphorus atoms. On the other hand, if the polymetaphosphate molecule contains five hundred phosphorus atoms then there will be four titratable end-groups per one thousand phosphorus atoms.

The end-group titration method gives the "number average molecular weight" of the polymetaphosphate in solution. This is the degree of polymerization represented as the number of phosphorus atoms per molecule. In other words, the end groups are calculated as equivalents of hydrogen per 1000 phosphorus atoms and if this quantity is defined as Z, then the degree of polymerization $$= \frac{2000}{(Z)}$$

The viscosity of the polymetaphosphate solutions must be measured under well defined conditions as is customary with viscosity measurements. First there is measured the viscosity of a solution containing sodium or potassium polymetaphosphate in aqueous solution at a pH of eight to nine and at a concentration equivalent to one per cent by weight of $KPO_3$. The viscosity of this solution is measured by the capillary pipette method. This method is standard and needs not be described at any length here. The measurement is carried out at 25° C.

The viscosity is expressed as the relative viscosity of the polymetaphosphate solution considering the water solvent as having a viscosity of 1.0. In other words, it is relative to water. The solution must be free from organic solvents and from foreign anions or cations other than sodium or potassium. This is all in accordance with standard practice on viscosity determinations. To correlate with molecule weight it is desirable to express the viscosity with reference to "specific viscosity" which equals relative viscosity minus one.

In the drawing are shown the properties of a pure potassium polymetaphosphate suitable for use according to the invention. On the horizontal axis is indicated the number of phosphorus atoms per molecule degree of polymerization, as determined by end-group titration. On the vertical axis is shown the viscosity of a solution of the potassium or sodium polymetaphosphate. The viscosity for a sodium or potassium polymetaphosphate solution prepared as described hereinafter is shown corresponding to a degree of polymerization equivalent to 130 to 5000 phosphorus atoms per molecule. As the number of phosphorus atoms increases to above about 1000 the determination by end-group titration becomes less reliable. The curve, however, can be extended beyond this point and the number of phosphorus atoms determine more accurately a viscosity determination.

The relationship shown in the curve can be represented by the formula:

4. $$y = 0.61x + 2.12$$

In the formula:

$x = \log$ (specific viscosity)
$y = \log$ (degree of polymerization)

The log in each case is the logarithm to the base of 10.

It will be seen that the number of phosphorus atoms in the molecule is determined by end-group titration or viscosity of a sodium or potassium polymetaphosphate. Having ascertained the number of phosphorus atoms per molecule by viscosity determination or end-group titration, one may thereafter proceed to make compounds of the invention by any of the various methods as described above.

Normally in commercial practice after an operation is established it is assumed that the product will have the designated structure if the process is operated always in the same way. But if one prepares a quaternary ammonium polymetaphosphate as shown above which has the structures of Formulas 1, 2, or 3, and then wishes to check whether it does contain the desired number of phosphorus atoms per molecule as herein described, this may be done by converting the polymetaphosphate back to the potassium or sodium compound. This can be done by double decomposition reactions in which there is added a sodium or potassium compound the anion of which forms a very insoluble compound with the cation that is to be removed. For instance, lead can be removed with sodium sulfide and quaternary ammonium groups with sodium dichromate. Conversion can probably most conveniently be done by the use of ion-exchangers which remove the cations and allow the preparation of the polymetaphosphoric acid which can then be converted to a suitable compound for test by neutralization with a sodium or a potassium compound, or both. However, when this procedure is used there may be some degradation of the product unless extreme precautions are taken. Accordingly, it will be preferred to use the sodium or potassium form of the ion-exchanger to produce directly the sodium or potassium polymetaphosphate of corresponding molecular weight.

It will be understood that the designation of the number of phosphorus atoms per molecule conforms to the best scientific evidence now available and that it represents a convenient way of designating compounds having the degree of polymerization which it is desired to use. It will also be seen that the figure represents an average of the molecules in a given product. It is to be understood, however, that the invention is not to be limited by theoretical considerations but that the mode of designation is for the convenience of one skilled in the art as an aid in identification and designation.

In order that the invention may be better understood, reference should be had to the following illustrative examples.

*Example 1*

First there was made a high molecular weight potassium polymetaphosphate. This was prepared by heating pure potassium dihydrogen phosphate to 675° C. for forty minutes. The resulting crystalline product was quickly cooled.

One part by weight of finely pulverized potassium polymetaphosphate obtained in this manner was stirred in fifty parts by weight of water together with seven parts by weight of the air-dried sodium salt of "Dowex 50" ion-exchange resin. The pH during the ion-exchange step was maintained between eight and nine by the addition of traces of dilute sodium hydroxide solution.

The solution rapidly became highly viscous and the suspended, insoluble potassium polymetaphosphate disappeared as it went into solution. The resin was then removed from the solution by filtration. This stock solution of the sodium-potassium polymetaphosphate was then used for the preparation of quaternary ammonium salt according to the invention.

As prepared as above described, the stock solution showed a specific viscosity of forty. This corresponds to 1,200 phosphorus atoms per molecule. This figure was determined by extrapolation of the curve obtained by end-group titration up to a thousand phosphorus atoms per molecule as shown in the drawing.

It should be observed that this solution is not permanently stable and should be used for the preparation of a quaternary ammonium salt according to the invention within a few days. The viscosity slowly drops due to a degradation of the polymer and a lowering of its molecular weight.

For the preparation of lauryl pyridinium polymetaphosphate the potassium-sodium polymetaphosphate solution prepared as above was placed in a mixer provided with means for violent agitation and 0.33 molar solution of lauryl pyridinium chloride was slowly titrated into the mixture during violent agitation. There is an immediate appearance of a precipitate as exidenced by a cloudiness of the solution. The viscosity of the solution dropped as the polymetaphosphate was removed from solution. As the precipitation of the quaternary ammonium polymetaphosphate proceeded the viscosity of the solution diminished and as the quantity of the quaternary ammonium chloride solution approached an equivalent point, the aqueous medium completely lost its viscosity and the precipitate coagulated to give an extremely sticky, viscous hydrated mass.

This solid product was collected, squeezed, and worked mechanically to remove water. The product was washed briefly in cold water to remove the potassium and sodium chlorides which were occluded. The product was then pressed into the form of a sheet. This sheet became firm and translucent when dried. It was found to be somewhat elastic and extensible. When stretched the film showed an X-ray diffraction pattern characteristic of an oriented polymer.

The film is soluble in organic solvents such as chloroform from which thin films and coatings can be applied to surfaces such as metal. The compositions can be used for inclusion in film-forming and coating compositions and in adhesives. They are very sticky and lend valuable properties to adhesive formulations. The films and coatings including these materials make surfaces water-repellant.

The quaternary ammonium polymetaphosphate precipitated contained about 85% of its cation as the quaternary ammonium group. The remaining 15% of the cation being still present as sodium and potassium.

In a similar preparation the quaternary ammonium compound was added in still further quantity to effect complete replacement of the sodium and potassium, the replacement occurring between the solution and the already precipitated material.

Following the procedure above, lauryl trimethyl ammonium polymetaphosphates were prepared which were similar to the products of the example.

*Example 2*

Preparation of a tetramethylammonium polymetaphosphate of the invention was conducted as follows:

The crystalline anhydrous polymetaphosphate prepared as above was pulverized and slurried with five times its weight of air-dried "Dowex 50" resin in its acid form. One part of potassium polymetaphosphate and five parts of "Dowex 50" were slurried in 100 parts of ice water. The solution contained a partial potassium salt of the polymetaphosphoric acid and had a pH of 2. In order to remove as much of the potassium as possible it was then passed thru a column of "Dowex 50" resin in hydrogen form. The temperature of the solution at all times being maintained between zero and 5° C. The operation was conducted as rapidly as possible. In this case it is necessary to use low temperatures and to work rapidly in view of the very low pH. At these low pH's the polymetaphosphoric acid is rapidly degraded. The degree of degradation can be determined at any point by neutralizing the solution with potassium or sodium hydroxide and measuring the viscosity by the technique previously described.

The effluent from the ion-exchange column had a pH of about 1.6 and it was immediately neutralized to pH 9 with tetramethylammonium hydroxide. The metaphosphate so obtained had a degree of polymerization of 330 phosphorus atoms per molecule as indicated by end-group titration of a potassium-sodium salt solution prepared from the same free polymetaphosphoric acid. The specific viscosity of the potassium-sodium polymetaphosphate at an equivalent $KPO_3$ concentration of one per cent was 4.4.

The tetramethylammonium polymetaphosphate solution was rapidly concentrated under vacuum and dried to a film. The film was strong, flexible, and when oriented by cold drawing showed an X-ray diffraction pattern typical of an oriented high polymer. The film is soluble in water and can be cast in thin layers on metallic surfaces. A 10 per cent solution of the air-dried film in water at 25° C. had a viscosity of 26.6 centipoises. Although the viscosity of this solution dropped from 26.6 to 14.1 centipoises after 23 days at 25 to 30° C., complete degradation did not occur even after four months, since at the end of this time a strong and flexible film could still be cast from the solution.

The product can be used for strengthening paper by impregnation. In view of the relatively low organic content of the product and the high phosphate content, it forms relatively non-inflammable films which will scarcely support combustion.

In the compound as produced, above 81 per cent of the cations were quaternary ammonium groups. About eight or nine per cent of the cations was sodium or potassium.

As in Example 1 a composition as in formula 1 can be prepared by the addition of still further quaternary ammonium compound in the solution, as above described, to replace substantially all of the alkali metal with quaternary ammonium groups.

*Example 3*

A series of tetramethylammonium polymetaphosphates of successively lower molecular weights was prepared using the general procedure of Example 2.

After the free polymetaphosphoric acid solution was formed it was permitted to stand at between 5 and 10° C. for a period of twenty-four hours instead of preparing the salt immediately. From time to time samples were removed from the solution of polymetaphosphoric acid and neutralized to pH 8 by the addition of tetramethylammonium hydroxide solution. The neutralized solution, as in Example 2, was concentrated by evaporation at 20 to 40° C. under vacuum until a viscous fluid was obtained. This was evaporated to yield a film.

At the same time that a portion of the acid was removed for the preparation of the quaternary ammonium compound, a separate sample was removed and titrated with sodium hydroxide solution to a pH of 8. From the viscosity of the sodium polymetaphosphate solution the degree of polymerization was determined.

As the polymetaphosphoric acid solution stood, the degree of polymerization dropped. The quaternary ammonium polymetaphosphates produced were increasingly more hygroscopic and were increasingly more soft with the drop in molecular weight.

At a degree of polymerization of 140 the air-dried film was quite tacky and hygroscopic although firm and self-supporting when thoroughly dried. At a degree of polymerization of 130 the film was even more hygroscopic and was very soft in a humid atmosphere and scarcely self-supporting. As the degree of polymerization dropped below this figure the products changed rapidly in character.

In the products as prepared above, about 93 per cent of the polymetaphosphate ions were neutralized by the tetramenthylammonium ions with the remaining 7 per cent satisfied by sodium and potassium.

*Example 4*

A tetramethylammonium polymetaphosphate with a degree of polymerization over about a thousand was prepared as follows:

A tetramethylammonium salt of an ion-exchange resin was prepared by titrating eighty parts by weight of Nalcite HCR in its acid form with 1.11 normal tetramethylammonium hydroxide until the pH was 7.55. The resulting resin was filtered and washed.

To a slurry of four parts by weight of potassium polymetaphosphate (prepared as in Example 1) in 196 parts by weight of boiled distilled water was added 20 parts by weight of the tetramethylammonium resin. The mixture was stirred twelve minutes and twenty more parts by weight of resin was added at which point the pH was 6.45. A dilute solution, 0.05 per cent, of tetramethylammonium hyroxide was added to bring the pH up to 6. The mixture was filtered and twenty more parts by weight of tetramethylammonium resin added to the filtrate and stirred fifteen minutes. Still another batch of tetramethylammonium resin was added and stirring repeated, and the pH brought up to seven with dilute tetramethylammonium hydroxide. The mixture was again filtered.

The filtrate was found to contain a product in which 0.55 quaternary ammonium ions were present for each phosphorus atom. A portion of the filtrate was evaporated to dryness and the film examined. When dried over calcium chloride, the film was hard, clear, slightly hygroscopic and brittle but replasticized with moisture upon standing in air. The film was superior to one produced from a tetramethylammonium polymetaphosphate made by neutralizing polymetaphosphoric acid with tetramethylammonium hydroxide since the degradation which occurs at low pH was avoided.

*Example 5*

Tetramethylammonium polymetaphosphates of Formula 2, were prepared with various contents of alkali metal ion.

Metaphosphoric acid was prepared as in Example 2 but the resin used was partly in the sodium form. The sodium ions remained after a partial regeneration of a sodium-form resin with acid. Under the conditions used 63 per cent of the polymetaphosphate was converted to free polymetaphosphoric acid, the remainder being present as sodium polymetaphosphate.

Immediately after preparation of the acidic solution at 5 to 10° C. portions were taken for neutralization with tetramethylammonium hydroxide and with mixtures of tetramethylammonium hydroxide with sodium hydroxide and potassium hydroxide, respectively. During the preparations the acidic solution degraded slowly so that the degree of polymerization dropped from 370 to 230 but in all cases the degree of polymerization lay within this range.

The neutralized solutions, all of which had a pH around 8, were evaporated to clear films.

Where the neutralization was conducted with tetramethylammonium hydroxide the final polymetaphosphate contained a quantity of tetramethylammonium ions equivalent to 63% of the total polymetaphosphate ions, the remainder being sodium ions. This film was a somewhat tacky, hydroscopic, elastic, soft, flexible self-supporting, transparent and water-soluble material.

In another example where 31% of the polymetaphosphate ions were neutralized by tetramethylammonium hydroxide, 32% by potassium hydroxide, and the remainder by the sodium ions already present in the solution, the film was slightly tacky, clear, firm, practically inelastic, and strong. It was water-soluble.

A corresponding film containing about 31% of the metaphosphate ions neutralized by tetramethylammonium ions, the remainder being satisfied by sodium ions, was a very similar material. In another example 16% of the polymetaphosphate ions were neutralized with tetramethylammonium, 47% by potassium and the remainder by sodium. This material was a self-supporting, although somewhat brittle, film, which exhibited appreciable strength.

From these observations it is evident that the flexibility and elasticity of the films decrease as the proportion of tetramethylammonium ion is reduced, but that even 16% of tetramethylammonium ions, on the basis of total cations, is sufficient to plasticize the product. In a control experiment where no tetramethylammonium ions were present, but where the metaphosphoric acid was completely neutralized, in one case by sodium hydroxide and in another case by potassium hydroxide, the dried films were very brittle and could be scarcely removed from the substrate without cracking.

Example 6

Tetramethylammonium polymetaphosphate was prepared from a lead polymetaphosphate in the following manner.

A crystallized lead polymetaphosphate was used for the preparation of the film-forming quaternary ammonium polymetaphosphate. The lead polymetaphosphate was prepared as follows:

Calculated quantities of pure lead oxide and of 85% phosphoric acid were taken to yield a mixture containing two atoms of phosphorus per atom of lead. The lead oxide was added to the phosphoric acid, yielding a white paste which solidified on cooling. This was dried at 110° C. for about 18 hours and then heated in a platinum dish to a temperature of 770° C., at which point a clear melt was obtained. This melt was then cooled to 650° C. at a rate of 12° C. per hour, and held overnight at 650° C.

The product was then cooled to 500° C. and removed from the furnace and found to be a clear glass. This glass was then pulverized in a mortar and re-heated in a platinum dish to 540° C. for 30 minutes. At the end of this time the mass had been converted to a completely crystalline condition. These crystals melted sharply at 660° C. This crystalline lead polymetaphosphate was then converted to tetramethylammonium polymetaphosphate by reaction with tetramethylammonium sulfide in aqueous suspension, yielding a precipitate of lead sulfide in a solution of tetramethylammonium polymetaphosphate.

The tetramethylammonium sulphide solution was prepared as follows: 7.4 cc. of 1.1. normal tetramethylammonium hydroxide solution was saturated with gaseous hydrogen sulfide. The pH dropped to 7.1. The addition of hydrogen sulfide was then stopped and the pH of the solution was raised to 10 by the addition of 0.8 cc. of the above tetramethylammonium hydroxide solution. To this solution 3 grams of finely pulverized crystalline lead polymetaphosphate was added slowly and with vigorous stirring. The solution became very viscous and lead sulphide appeared as a black precipitate. During this stirring the pH dropped temporarily to 4.1 but was brought back to 8.9 by the addition of 2.2 cc. of the 1.1 normal tetramethylammonium hydroxide solution. Stirring was continued for 25 minutes.

Since it was desired to have no free tetramethylammonium sulfide in the solution, 0.5 gram of the pulverized lead metaphosphate was added and stirring was continued for another 25 minutes at room temperature. Lead sulfide was then removed from the solution by centrifuging and the clear supernatant liquid was poured off from the precipitate and dried to a film. The product was hydroscopic and tacky when exposed to a moist atmosphere although hard and coherent in a dry atmosphere.

Example 7

Dimethyl di-n-octadecyl ammonium polymetaphosphate according to the invention was prepared.

First there was prepared a potassium polymetaphosphate of a high viscosity from chemically pure potassium dihydrogen phosphate. The dihydrogen phosphate when dissolved in water in sufficient concentration to give a 0.1 molal solution gave a pH of 4.30. The potassium dihydrogen phosphate was heated in a porcelain vessel starting at 250° C. The temperature was gradually raised over a period of five and three-quarter hours to 665° C. This latter temperature was then maintained for a period of 35 minutes and the product was then allowed to cool in the air. The cooling was rapid, the temperature dropping to approximately room temperature within about 15 minutes.

The potassium metaphosphate thus produced was put into aqueous solution by ion-exchange with the sodium salt of an ion-exchange resin. 11.8 parts by weight of the pulverized potassium metaphosphate was added to 990 parts by weight of water. The potassium metaphosphate was practically insoluble but, nevertheless, lowered the pH to 5.2. The pH was then raised to 7 by the addition of a trace of sodium hydroxide. Then 100 parts by weight of the sodium salt of Nalcite HCR resin (a sulfonated polystyrene type of cation-exchange resin) was added and the mixture stirred for about 40 minutes. The potassium polymetaphosphate passed into solution. The ion-exchange resin was then removed from the solution by filtration.

A portion of the solution diluted to 0.2 $KPO_3$ gave a viscosity of 144 centipoises at 25° C. At 1% the specific viscosity was over 100 and was too high to be measured in a capillary type pipette, indicating that the molecular weight was considerably higher than that corresponding to a degree of polymerization of 1000. The solution produced contained 1.18% $KPO_3$.

To prepare the quaternary ammonium polymetaphosphate, dimethyl di-n-octadecyl ammonium bromide, which is relatively insoluble, was dispersed in water with violent agitation at the rate of 12 parts by weight of the salt to 100 parts by weight of water. To the suspension was added 236 parts by weight of the 1.18% potassium polymetaphosphate solution with violent agitation. Since the molecular weight of the quaternary ammonium bromide is about 627, it will be noted that 0.81 mol of the quaternary ammonium compounds were used per equivalent of $KPO_3$, so that the product also contained 0.19 equivalent of potassium per atom of phosphorus.

The product was a foamy, extremely tacky solid which, when air-dried, formed continuous films on glass and paper which were highly water-repellent. It is particularly noted that the material showed a strong adhesion to surfaces such as metal, glass, and even to the fingers. Ordinarily, wax-like materials which repel water show poor adhesion to such surfaces.

Example 8

N-octadecyl dimethyl benzyl ammonium polymetaphosphate was prepared by a process like that described in Example 7.

N-octadecyl dimethyl benzyl ammonium chloride was dispersed in water to give a dispersion at a concentration equivalent to 0.2 molar. This was added slowly to 200 parts by weight of a 0.1 normal $KPO_3$ solution prepared as in Example 7. The suspension was violently agitated. There was a complete coagulation of the phosphate, and the resinous mass was washed on a filter and pressed out into a thin sheet and permitted to dry in the air to a waxy, crumbly mass. The material was film-forming and was dissolved in chloroform to give a highly viscous solution which, when applied to glass and to metal surfaces, dried to a coherent, continuous, highly water-repellent coating. It was also noted that the material softened to a viscous mass when warmed to 90° C. and films could be pressed from this melt. The films provided a water-repellent finish on paper.

Example 9

Di-isobutylphenoxy ethoxyethyl dimethylbenzyl ammonium polymetaphosphate was prepared following the procedure outlined in Examples 7 and 8.

Di-isobutylphenoxy ethoxyethyl dimethylbenzyl ammonium chloride was prepared as a 0.4 normal solution and added to approximately four times its volume of a 0.1 normal potasium metaphosphate solution prepared as in Example 7. When the reagents were present in approximately equivalent quantities, a sticky mass was obtained which, when washed with cold water and pressed into a sheet and air-dried, was an elastic, transparent solid which could be pressed into flexible films.

Example 10

Cetyl trimethyl ammonium polymetaphosphate was prepared by a process similar to that outlined in Example 1. A 0.33 molar solution of cetyl trimethylammonium bromide was added to three times its volume of 0.1 molar $KPO_3$ solution with vigorous agitation. When approximately the stoichiometric quantities had been mixed, there was obtained an extremely tacky, resinous mass which was washed with cold water and pressed to form a sheet which was permitted to air-dry. When stretched the material could be pulled out into soft, fibrous masses and it showed some evidence of molecular orientation or "cold-drawing."

Example 11

Illustrative of a compound of Formula 3, there was prepared a cetyl trimethylammonium polymetaphosphate cross-linked with barium.

A potassium Kurrol salt as shown in Example 1 was used. This salt was first dissolved by ion-exchange with the sodium salt of an ion-exchange resin as in Example 2. The solution of alkali metal polymetaphosphate produced was highly viscous, the degree of polymerization being greater than 1000. The concentration of equivalent $KPO_3$ in this solution corresponded to a 0.1 molar strength.

The barium salt used as a cross-linking agent was dissolved in water and diluted to a concentration corresponding to 0.08 molar. Cetyl trimethylammonium bromide was dissolved to yield a solution which was 0.339 normal.

In preparing the compound the mixing of these components was conducted in a vessel fitted with a high-speed stirrer which vigorously agitated the mixture. The alkali metal polymetaphosphate solution was first placed in the vessel and the required quantity of the barium salt solution was slowly added to the vortex formed by the stirrer.

It is noted that unless agitation is very thorough and unless the mixing of the metal salt solution with the polymetaphosphate occurs almost instantaneously some local precipitation is apt to occur. This is to be avoided. When the metal salt solution has been introduced the quaternary ammonium salt solution is then slowly added and with continued vigorous agitation. The precipitated polymer is gathered from the walls of the container and pressed into a solid mass.

Barium, as barium chloride, was used as above described to effect cross-linking. One atomic weight of barium was used per ten atomic weights of phosphorus, corresponding to 20% of the polymetaphosphate ions being neutralized by the divalent barium ions; 66% of the polymetaphosphate ions were neutralized by cetyl trimethyl ammonium ions while the remaining 14% were satisfied by alkali metal ions.

It was found that after the precipitate had been formed the solution was essentially free of polymetaphosphate, barium and quaternary ammonium ions, indicating that all the components were combined in the product.

A similar process in which no barium salt was added, and in which 96.7% of the polymetaphosphate ions were satisfied by the quaternary ammonium ions, gave a slightly tacky, very flexible, soft, easily stretched opaque resinous mass which could be pressed into a film.

The product cross-linked by means of barium was non-tacky and flexible and considerably stronger than the control. It could be cold-drawn by stretching, yielding an opaque rope-like solid having a fiber-like structure which could be split readily in the direction of stretching, indicating orientation of the polymer.

The non-cross-linked polymer could be continuously stretched indefinitely by the slow application of tension. Cross-linking by means of the polyvalent metal ions brought about a characteristic stiffening of the structure such that upon the application of tension the polymer mass could not be stretched more than two to four-fold, after which point further stretching required a considerably greater force.

Example 12

Illustrative of a compound of Formula 3 there was prepared a cetyl trimethylammonium polymetaphosphate cross-linked with chromium.

Chromium was introduced into the compound as was barium in Example 11, using a solution of chromium chloride. Chromium was introduced in the amount of 6.7 atoms per hundred atoms of phosphorus. The product was a green, flexible, solid polymer which was considerably tougher and less readily stretched than a cetyl trimethylammonium polymetaphosphate prepared under similar conditions but containing no chromium.

Example 13

Illustrative of a compound of Formula 3, there was prepared a cetyl trimethylammonium polymetaphosphate cross-linked with nickel. A nickel nitrate solution was used after the manner described in Example 11. In the product approximately 20% of the polymetaphosphate ions were satisfied by divalent nickel ions, the remainder being satisfied by cetyl trimethylammonium ions.

The precipitated product was an opaque, soft, flexible, somewhat elastic, slightly tacky, leathery solid which could be stretched to about three times its length before breaking. It was considerably stronger than a quaternary ammonium polymetaphosphate prepared in the same way but without the nickel.

Example 14

Illustrative of a compound of Formula 3, there was prepared a cetyl trimethylammonium polymetaphosphate cross-linked with cadmium.

Cadmium chloride solution was used as described in Example 11, the quantity being such that 20% of the polymetaphosphate ions were neutralized by divalent cadmium ions. The product was leathery, non-tacky, opaque, flexible, very strong and relatively non-elastic.

Example 15

Illustrative of a compound of Formula 3 there was prepared a cetyl trimethylammonium polymetaphosphate cross-linked and aluminum.

The polymer was prepared by a process as generally described in Example 11. A 1.0 molar solution of aluminum chloride was added to the potassium polymetaphosphate solution followed by the addition of the 0.339 molar solution of cetyl trimethylammonium bromide.

One product was prepared which contained 0.01 equivalent of aluminum per phosphorus atom. This product appears to be oriented when cold drawn. It is relatively non-tacky and is considerably stronger than a similar product omitting the aluminum.

Another composition was prepared in which there was 0.10 equivalent of the aluminum per phosphorus atom. This product was a firm, coherent mass which could not be stretched more than about 20% without breaking. When dried the product could be oriented to some extent as indicated by the fact that when stretched about 20% the mass took on a fibrous appearance and seemed to be incapable of further elongation without breaking.

In the compounds as described in Examples 12 thru 15, the cations are principally the quaternary ammonium ions and polyvalent metal ions. There will also present up to about 5% of sodium and potassium in the compounds.

Example 16

Illustrative of a compound of Formula 3, there was prepared a cetyl trimethylammonium quaternary ammonium polymetaphosphate cross-linked with lead. The compound was prepared as in Example 15 using a one molar solution of lead acetate. The product contained 0.50 equivalent of lead and, of course, about the same of the quaternary ammonium ions, though as above noted there is probably up to about 5% of sodium potassium present. The product was a soft, granular mass when wet. When the product was dried, it was firm and strong but somewhat brittle.

Example 17

Illustrative of a compound of Formula 3, there was prepared a cetyl trimethylammonium polymetaphosphate cross-linked with magnesium.

The product was prepared as in Example 15 using a one molar solution of magnesium chloride.

One product was prepared containing 0.04 equivalent of magnesium. This was considerably stronger than a product similarly prepared but containing no magnesium. The product could be stretched at least 100% without breaking.

A somewhat stronger product was made which contained 0.08 equivalent of magnesium. The product was slightly tacky, it could be stretched 100% and it appeared to be oriented as indicated by fibrous rupture.

A similar product was prepared containing 0.16 equivalent of magnesium. This product was non-tacky and leather-like. It could be stretched about 50% without breaking.

A product was prepared containing a still higher quantity of magnesium, namely, 0.32 equivalent. The product was firm and leathery. The tensile strength was higher than that of the product containing 0.16 equivalent but it could not be stretched more than about 25% without rupture.

A product containing about 0.48 equivalent of magnesium was strong and somewhat brittle when dry. The product breaks when stretched more than about ten to fifteen per cent.

In all of the products just described the quaternary ammonium ion constitutes substantially the balance of the compound as above described but there will be a small amount, say up to about five per cent, of sodium or potassium or both.

Example 18

Illustrative of a compound of Formula 3, there was prepared a tetramethylammonium polymetaphosphate cross-linked with magnesium.

The salt was prepared from the free polymetaphosphoric acid obtained from a high molecular weight Kurrol salt. The acid solution was prepared as follows:

Thirty-five parts by weight of Kurrol salt $KPO_3$, prepared by heating pure potassium dihydrogen phosphate for forty minutes at 665° C., was solubilized in 3,465 parts by weight of distilled water at 8° C. with 210 parts of Nalcite HCR resin (a cation-exchanger of the type of "Dowex-50" described above in some detail) in its hydrogen form. The mixture was stirred at 8° C. for thirty minutes and filtered to yield a solution of polymetaphosphoric acid, still containing some potassium ions, having a pH of 1.92.

About seventeen minutes later, the solution was introduced into an ion-exchange column containing 650 parts by weight of the Nalcite HCR resin in its hydrogen form, the passage of the solution through the column being completed in about 1.25 hours. The polymetaphosphoric acid effluent, which still contained about one quarter of the original potassium, had a pH of 1.80 and corresponded to a concentration of 0.764% by weight of equivalent $KPO_3$.

The molecular weight of the polymetaphosphoric acid was determined by neutralizing a sample of this acid with sodium hydroxide solution to a pH of 8. The resulting solution contained polymetaphosphate equivalent to 0.72% $KPO_3$ and had a viscosity of 3.1 at 1% equivalent $KPO_3$ concentration. By reference to the drawing it will be noted that this corresponds to a degree of polymerization of about 250.

Simultaneously with the neutralization of a portion of the polymetaphosphoric acid with sodium hydroxide for determination of molecular weight another portion was partially neutralized with magnesium hydroxide and then with tetramethylammonium hydroxide to a pH of about 8. The resulting solution was then concentrated under vacuum and finally evaporated to dryness in the atmosphere to yield a film.

Since the polymetaphosphoric acid solution still contained some potassium ions, the full equivalent of metal hydroxide and quaternary ammonium base per phosphorus atom was not required in the neutralization steps. The resulting products contained some potassium ions in addition to the cross-linking metal ions and the quaternary ammonium ions.

In the preparation of the product of this example, 66% of the equivalent polymetaphosphoric acid groups were neutralized with magnesium ions while 18% were neutralized with tetramethylammonium ions. The products obtained were non-tacky, brittle, hard, and they could be dissolved in water only very slowly. Films produced from the products were self-supporting but the product contained too much magnesium for optimum flexibility and strength.

Example 19

Illustrative of a compound of Formula 3 there was prepared a trimethylammonium polymetaphosphate cross-linked with beryllium.

The composition was prepared as in Example 18 using beryllium sulfate. In the compound, 18% of the metaphosphate ions were neutralized by beryllium, assuming it to be divalent, and 64% were neutralized by tetramethylammonium ions. The product produced films which were tacky, elastic, and flexible. They became somewhat harder when thoroughly dried. The film was plasticized by the humidity of the atmosphere and it dissolved readily in water.

It is noted that the films prepared as in this example, and as in Example 18, were stronger and firmer than similar films of tetramethylammonium polymetaphosphate in which 72% of the metaphosphate equivalents were neutralized by trimethylammonium ions, the remaining valences being satisfied only by potassium and there being present no cross-linking ions.

Example 20

Illustrative of a compound of Formula 3 there was prepared a benzyl trimethylammonium polymetaphosphate cross-linked with magnesium.

The product was prepared as in Example 18, 49% of the metaphosphate ions being neutralized by the quaternary ammonium ions, and 26% by divalent magnesium ions. The film produced was non-tacky, elastic, strong, and flexible. The product was soluble in water.

A film prepared in the same way but without magnesium was tacky and sticky, especially in a highly humid atmosphere, though it was self-supporting and strong when dry.

Example 21

Illustrative of a compound of Formula 3, there was prepared a tetramethylammonium polymetaphosphate cross-linked with calcium.

The product was prepared as in Example 18, using calcium chloride. The polymetaphosphoric acid solution used had a degree of polymerization of about 380. A film was prepared of a product in which 29% of the polymetaphosphate ions were neutralized with tetraethylammonium ions and 30% by divalent calcium ions. The film produced from the product was non-tacky, very flexible, soft, and somewhat elastic. When the product was thoroughly dried over $P_2O_5$, it became more brittle, but was quite hard and strong.

A similar polymetaphosphate prepared by neutralizing with tetramethylammonium hydroxide and containing no calcium was tacky, soft, and was less strong than a film containing calcium when thoroughly dried. Both films were water-soluble and self-supporting.

Example 22

Illustrative of a compound of Formula 3, there was prepared a tetramethylammonium polymetaphosphate cross-linked with zinc.

The procedure of Example 21 was followed exactly excepting that zinc chloride was used instead of calcium chloride. The film was very similar to the film produced in the preceding example. There was some evidence, however, that zinc was slightly more effective in cross-linking since the film was somewhat stiffer.

Example 23

Illustrative of a compound of Formula 2, there was prepared a tetramethylammonium polymetaphosphate containing lithium.

A solution of polymetaphosphoric acid having a degree of polymerization corresponding to 250 was neutralized with a mixture of lithium hydroxide and tetramethylammonium hydroxide in such a ratio that in the final mixture 29% of the polymetaphosphate ions were neutralized with quaternary ammonium ions, 41% with lithium ions and the remainder with potassium ions which had not been removed from the metaphosphoric acid solution by ion exchange. The film produced from this solution was strong, somewhat elastic, and non-tacky. It was readily soluble in water.

Example 24

Illustrative of a compound of Formula 2, there was prepared benzyl trimethylammonium polymetaphosphate containing potassium.

The procedure of Example 23 was closely followed using a polymetaphosphoric acid with a degree of polymerization of 250. This was neutralized with benzyl trimethylammonium hydroxide. The final product had about 70% of the polymetaphosphate ions neutralized by the quaternary ammonium ions and the remainder by potassium ions. The polymer produced was very tacky and elastic, becoming somewhat brittle when thoroughly dried. The product was water-soluble.

Example 25

Illustrative of a compound of Formula 2, there was prepared a tetraethanolammonium polymetaphosphate containing potassium.

Following the procedure of Example 23 and using a polymetaphosphoric acid solution with a degree of polymerization of 250, a product was prepared by the addition of tetraethanolammonium hydroxide. The product had 76% of the polymetaphosphate ions neutralized by the quaternary ammonium ions, the remainder being satisfied by potassium ions which were originally present in the polymetaphosphoric acid solution. The films produced from this product were very strong and flexible when thoroughly dried, becoming elastic and tacky when exposed to a humid atmosphere. The film was water-soluble.

Example 26

Illustrative of a compound of Formula 2, there was prepared a phenyl trimethylammonium polymetaphosphate which contained potassium.

Following the practices outlined in the foregoing examples, a polymetaphosphoric acid of a degree of polymerization of 250 was neutralized with a phenyl trimethylammonium hydroxide. About 80% of the polymetaphosphate ions were neutralized by the quaternary ammonium ions, the remainder being potassium. Films produced from the product were very tacky and elastic in a humid atmosphere, becoming firm and quite strong and only slightly tacky in a dry atmosphere. The film was self-supporting.

Example 27

Illustrative of a compound of Formula 3, there was prepared a tetraethanolammonium polymetaphosphate containing magnesium.

In this example a Kurrol salt was solubilized by ion-exchange with the magnesium salt of an ion-exchange resin in combination with the tetraethanolammonium salt of an ion-exchange resin. By this means both magnesium ions and tetraethanolammonium ions were introduced into the polymer.

For the preparation of the salts of the ion-exchange resins the acid form of Nalcite HCR was neutralized with magnesium hydroxide and tetraethanolammonium hydroxide, respectively.

The preparation of the quaternary ammonium resin salt was conducted as follows: 80 parts by weight of air-dried Nalcite HCR resin in its hydrogen form were slurried with just enough water to cover the resin. To this suspension about 80 parts by weight of a 21% solution of phenyltrimethylammonium hydroxide were added and the mixture stirred for about one hour. At the end of this time the supernatant liquid had a pH of about 8. It is important to give the base time to penetrate the ion-exchange resin particles in order to be sure that the hydrogen ions on the resin are converted to the salt form. The quaternary ammonium resin salts, also, usually contained a small proportion of sodium ions which are difficult to remove during the original preparation of the resin in its hydrogen form. The resin was then drained free from liquid on a filter and used directly in the treatment of Kurrol salt.

Two parts by weight of pulverized Kurrol salt, $KPO_3$, were slurried into 200 parts by weight of water and then six parts by weight of the drained magnesium resin and 20 parts by weight of the drained tetraethanolammonium resin salts were added. The pH was immediately adjusted to about 8 by the addition of a small quantity of tetraethanolammonium hydroxide. The Kurrol salt passed into solution as the mixture was stirred at room temperature for about 40 minutes. Since polymetaphosphate ions are relatively stable at the pH used, the degree of polymerization corresponded to that in the Kurrol salt used, which was over 1000.

The resin was then removed from the solution and the latter was evaporated to yield a polymer film. The air-dried film was transparent, strong, flexible, somewhat tacky, and was soluble in water. The molecular weight of the polymer corresponded to a degree of polymerization well over 1000.

Example 28

Illustrative of a compound of Formula 3, there was prepared a phenyl trimethylammonium polymetaphosphate containing magnesium.

The procedure followed was that of Example 27 except that phenyl trimethylammonium hydroxide was used instead of tetramethylammonium hydroxide.

It is to be noted that in the process the pH of the solution was maintained near neutrality so that there was practically no degradation of the polymetaphosphate. The degree of polymerization was greater than 1000.

Upon evaporation of the solution in the air there was obtained a self-supporting, very soft, flexible, rubbery, transparent film which was water-soluble.

Example 29

Illustrative of a compound of Formula 3, there was prepared a benzyl trimethylammonium polymetaphosphate cross-linked with magnesium.

The product was prepared using a process like that of Example 27. The product of Example 20 had about 250 phosphorus atoms per molecule whereas the product of the present example has more than 1000 phosphorus atoms per molecule. In the present process the polymer was prepared entirely in a neutral medium and degradation was minimized. The films produced from products of the present example were considerably stronger and less hygroscopic than the products of Example 20.

Example 30

Tetraethylammonium polymetaphosphate was prepared following a process like that of Example 27. Two parts of $KPO_3$ were slurried in two hundred parts by weight of water and thereafter mixed with 20 parts by weight of wet, drained tetraethylammonium salt of Nalcite HCR ion-exchange resin.

The mixture was stirred 40 minutes during which time the Kurrol salts passed into solution yielding a very highly viscous solution. The viscosity was so great that it was evident that the degree of polymerization was well above 1000. The solution was recovered from the ion-exchange resin by filtration and was evaporated in a film 1/64 inch thick at room temperature. The air-dried film was self-supporting, soft, flexible, elastic, and transparent.

Example 31

Illustrative of a compound of Formula 3, there was prepared tetraethylammonium polymetaphosphate containing magnesium.

The product was prepared by a process like that of Example 27. Two parts by weight of $KPO_3$, six parts by weight of magnesium resin, and twenty parts by weight of tetraethylammonium resin were stirred together in 200 parts by weight of water. Evaporation of the solution obtained gave a film which was very soft, rubbery and hygroscopic but which was firm and self-supporting when well dried.

Example 32

In the present example cetyl trimethylammonium polymetaphosphate was modified by the inclusion of a filler.

Colloidal silica was introduced into a polymetaphosphate in the manner outlined below. The colloidal silica was prepared by removal of sodium from a sodium silicate solution using the acidic form of an ion-exchange resin. The product is known commercially as "Ludox."

To a 0.1 molar solution of sodium-potassium polymetaphosphate, having a degree of polymerization greater than 1000, a solution of colloidal silica was added with vigorous agitation. The solution of colloidal silica contained silica particles of about 20 millimicrons in diameter, suspended in water at a concentration of 30% $SiO_2$ by weight, stabilized against gelling by the presence of sufficient sodium hydroxide to give a pH of about 9.5. Magnesium chloride solution was then added as a cross-linking agent and finally cetyl trimethylammonium bromide solution was added to form the quaternary ammonium salt, which immediately formed a precipitate which carried with it practically all of the silica.

In the resulting product 20% of the polymetaphosphate ions were neutralized by divalent magnesium ions, and 77% by the quaternary ammonium ions, the remainder being alkali metal ions. This product contained 5 parts by weight of $SiO_2$ per 3.5 parts by weight of solid $KPO_3$ used. The resulting polymeric mass was pressed out into a thin sheet and permitted to dry, yielding a leathery, opaque, tough, plastic-like solid which was considerably stiffer and stronger than a control from which silica was omitted.

*Example 33*

A product similar to that of Example 32 was prepared but 5 parts by weight of carbon black (Gastex) of the type used in reinforcing rubber was substituted for the $SiO_2$. In this case the carbon black was first suspended in twice its weight of water and then incorporated into the alkali metal polymetaphosphate solution before the addition of magnesium chloride and cetyl trimethylammonium bromide solutions. The leathery product so obtained was considerably firmer and harder than the control although somewhat less flexible than the polymer containing the silica.

The resins of this invention can be modified as are other resinous and gum-like materials already in use. They may, for instance, include plasticizers of the conventional type, such as dibutyl phthalate, tricresyl phosphate, high boiling chlorinated solvents, etc. Similarly the resins may be modified by the inclusion of coloring materials, fillers, carbon black, and the like as illustrated in the examples.

We claim:

1. A quaternary ammonium salt of polymetaphosphoric acid characterized by its molecule containing at least 130 phosphorus atoms per molecule.

2. A quaternary ammonium salt of polymetaphosphoric acid characterized by its molecule containing from 500 to 1000 phosphorus atoms.

3. A quaternary ammonium salt of polymetaphosphoric acid characterized by its molecule containing from 130 to 5000 phosphorus atoms.

4. A quaternary ammonium salt of polymetaphosphoric acid characterized by its molecule containing more than 130 phosphorus atoms, the compound containing from ten per cent to a stoichiometrically equivalent quantity of quaternary ammonium groups.

5. A quaternary ammonium salt of polymetaphosphoric acid of the formula:

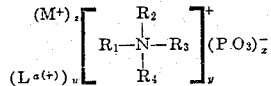

wherein:

$R_1$, $R_2$, $R_3$, and $R_4$ are hydrocarbon groups selected from the group consisting of monovalent groups, divalent groups, and heterocyclic groups which include the above nitrogen in their ring;

$x$ is not less than 130;

M is an alkali metal;

L is a polyvalent metal of valence "a" with a molecular weight below 210;

$y$ has a value from at least $1/10$ of $x$ to equal to $x$;

$w$ times $a$ plus $z$ plus $y$ equals about $x$;

$w/x$ equals up to about 0.25;

$z$ equals up to about $\frac{1}{10}$ of $x$.

6. An oriented crystalline quaternary ammonium salt of polymetaphosphoric acid characterized by its molecule containing at least 130 phosphorus atoms per molecule.

7. An oriented crystalline quaternary ammonium salt of polymetaphosphoric acid characterized by its molecule containing from 500 to 1000 phosphorus atoms.

8. An oriented crystalline quaternary ammonium salt of polymetaphosphoric acid characterized by its molecule containing more than 130 phosphorus atoms, the compound containing from ten per cent to a stoichiometrically equivalent quantity of quaternary ammonium groups.

9. A quaternary ammonium-alkali metal salt of polymetaphosphoric acid characterized by its molecule containing more than 130 phosphorus atoms, the compound containing from ten per cent to a stoichiometrically equivalent quantity of quaternary ammonium groups and the compound containing an alkali metal.

10. A quaternary ammonium-polyvalent metal salt of polymetaphosphoric acid characterized by its molecule containing more than 130 phosphorus atoms, the compound containing from ten per cent to a stoichiometrically equivalent quantity of quaternary ammonium groups and the compound containing a polyvalent metal of an atomic weight less than 210 in an amount not in excess of that required to combine with a fourth of the metaphosphate groups.

11. A quaternary ammonium-polyvalent metal-alkali metal salt of polymetaphosphoric acid characterized by its molecule containing more than 130 phosphorus atoms, the compound containing from ten per cent to a stoichiometrically equivalent quantity of quaternary ammonium groups and the compound containing a polyvalent metal of an atomic weight less than 210 in an amount not in excess of that required to combine with a fourth of the metaphosphate groups, and the compound containing an alkali metal.

MAX T. GOEBEL.
RALPH K. ILER.

REFERENCES CITED

The following references are of record in the file of this patent:

UNITED STATES PATENTS

| Number | Name | Date |
|---|---|---|
| 2,366,129 | Rust | Dec. 26, 1944 |

FOREIGN PATENTS

| Number | Country | Date |
|---|---|---|
| 711,866 | Germany | Oct. 8, 1941 |